US012779740B2

(12) United States Patent
Møller et al.

(10) Patent No.: US 12,779,740 B2
(45) Date of Patent: Nov. 3, 2026

(54) MOVABLE PLATFORM FOR A MOULD SYSTEM AND METHOD FOR HANDLING A MOULD SYSTEM COMPRISING A MOVABLE PLATFORM

(71) Applicant: LM WIND POWER A/S, Kolding (DK)

(72) Inventors: Jesper With Møller, Kolding (DK); Haris Jonuz, Kolding (DK); Poul Erik Hansen, Kolding (DK)

(73) Assignee: LM Wind Power A/S, Kolding (DK)

(*) Notice: Subject to any disclaimer, the term of this patent is extended or adjusted under 35 U.S.C. 154(b) by 425 days.

(21) Appl. No.: 18/275,869

(22) PCT Filed: Feb. 15, 2022

(86) PCT No.: PCT/EP2022/053631
§ 371 (c)(1),
(2) Date: Aug. 4, 2023

(87) PCT Pub. No.: WO2022/175244
PCT Pub. Date: Aug. 25, 2022

(65) Prior Publication Data
US 2024/0091989 A1 Mar. 21, 2024

(30) Foreign Application Priority Data
Feb. 18, 2021 (GB) .................................... 21157981

(51) Int. Cl.
*B29C 33/26* (2006.01)
*B29C 33/30* (2006.01)
(Continued)

(52) U.S. Cl.
CPC ............ *B29C 33/307* (2013.01); *B29C 33/26* (2013.01); *B29D 99/0028* (2013.01); *B29L 2031/085* (2013.01)

(58) Field of Classification Search
CPC ................ B29D 99/0028; B29C 33/26; B29L 2031/085
See application file for complete search history.

(56) References Cited

FOREIGN PATENT DOCUMENTS

| | | | |
|---|---|---|---|
| DE | 202017104848 | U1 | 9/2017 |
| DE | 102016013637 | A1 | 5/2018 |

(Continued)

OTHER PUBLICATIONS

DE202017104848 machine translation (Year: 2017).*

*Primary Examiner* — Alison L Hindenlang
*Assistant Examiner* — Alexander A Wang
(74) *Attorney, Agent, or Firm* — Dority & Manning, P.A.

(57) ABSTRACT

Disclosed is a mould system for moulding a blade shell of a wind turbine blade comprising a first mould for manufacturing a first blade shell part of the wind turbine blade; a second mould for manufacturing a second blade shell part of the wind turbine blade; a turning device configured to reposition the first mould between an open mould position and a closed mould position comprising a turning mechanism and a first primary beam connecting the turning mechanism and the first mould; a first scaffold arranged between the first mould and the second mould in the open mould position and comprising a first primary scaffold part and a first secondary scaffold part spaced apart by a first primary scaffold opening, the first primary scaffold allowing the first primary beam to move therethrough during repositioning of the first mould; a first primary movable platform attached to the first mould and being configured to move between an extended platform position and a stored platform position and covering the first primary scaffold opening in the extended position and arranged to expose the first primary scaffold opening in the stored platform position.

17 Claims, 9 Drawing Sheets

(51) Int. Cl.
*B29D 99/00* (2010.01)
*B29L 31/08* (2006.01)

(56) References Cited

FOREIGN PATENT DOCUMENTS

| | | | |
|---|---|---|---|
| GB | 2353320 | * | 2/2001 |
| GB | 2437737 | * | 11/2007 |
| GB | 2541446 | * | 2/2017 |
| WO | 2017009424 | A1 | 1/2017 |

* cited by examiner

MOVABLE PLATFORM FOR A MOULD SYSTEM AND METHOD FOR HANDLING A MOULD SYSTEM COMPRISING A MOVABLE PLATFORM

This is a National Phase Application filed under 35 U.S.C. 371 as a national stage of PCT/EP2022/053631, filed Feb. 15, 2022, an application claiming the benefit of European Patent Application No. 21157981.8, filed Feb. 18, 2021, the content of each of which is hereby incorporated by reference in its entirety.

The present disclosure relates a movable platform for a mould system for manufacturing turbine blades and a method for handling a mould system comprising a movable platform. More specifically, the present disclosure relates to the handling of a movable platform in a mould system during manufacturing of a wind turbine blade.

BACKGROUND

There is a constant need to improve the manufacturing facilities and the safety of operators during manufacturing of a wind turbine blade. The physical demands are high, and the operators are surrounded by chemical products which can cause health problems.

Thus, there is a need for more safe environments during manufacturing. Furthermore, the need for an optimization of the workflows of operators, reducing the manual labour and ultimately reducing the health risk of operators in the manufacturing plants of wind turbine blades.

SUMMARY OF THE INVENTION

It is an object of the present disclosure to provide a solution which at least improve the solutions of the prior art. Particularly, it is an object of the present disclosure to provide a mould system and a method for enhancing safety of wind turbine blade manufacture and facilitate optimizing manufacturing processes.

Accordingly, the present disclosure provides a movable platform for a mould system for manufacturing a wind turbine blade and a method for handling a mould system for manufacturing wind turbine blade comprising such a movable platform which overcome or ameliorate at least some of the disadvantages of the prior art.

In particular, the present disclosure provides a mould system for moulding a blade shell of a wind turbine blade. The mould system comprises a first mould for manufacturing a first blade shell part of the wind turbine blade. The first mould extends substantially along a longitudinal axis. The mould system comprises a second mould for manufacturing a second blade shell part of the wind turbine blade. The second mould extends substantially along the longitudinal axis.

The mould system comprises a turning device configured to reposition the first mould between an open mould position and a closed mould position. The first mould is arranged next to the second mould in the open mould position. The first mould is arranged on top of the second mould in the closed mould position. The turning device comprises a turning mechanism and a first primary beam connecting the turning mechanism and the first mould.

The mould system comprises a first scaffold arranged between the first mould and the second mould in the open mould position, e.g., between the turning mechanism and the first mould. The first scaffold extends along the longitudinal axis. The first scaffold comprises a first primary scaffold part and a first secondary scaffold part spaced apart in the longitudinal direction by a first primary scaffold opening. The first primary scaffold opening is configured to allow the first primary beam to move therethrough during repositioning of the first mould between the open mould position and the closed mould position.

The mould system comprises a first primary movable platform attached to the first mould and is configured to move between an extended platform position and a stored platform position. The first primary movable platform covers the first primary scaffold opening in the extended position. The first primary movable platform is arranged to expose the first primary scaffold opening in the stored platform position.

Also disclosed is a method for handling a mould system for manufacturing a wind turbine blade. The method comprises providing a mould system, such as the above described mould system, wherein the first mould of the mould system is in the open mould position, and the first primary movable platform of the mould system is in the extended platform position.

The method comprises laying up composite material in the first mould and the second mould. The method comprises positioning the first primary movable platform in the stored platform position. The method comprises securing the first primary movable platform in the stored platform position. The method comprises repositioning the first mould to the closed mould position.

It is an advantage of the present disclosure that an improved mould system for manufacturing wind turbine blades is provided. Particularly, due to a movable platform which is easier and safer to handle. It is a further advantage of the present disclosure that the movable platform is attached to the first mould, such that during repositioning of the first mould the movable platform follows the first mould and does not lay around as a separate part. Particularly, the movable platform does not create an occupational hazard in that there is reduced risk for falling over or getting body parts clamped under the movable platform.

The first scaffold may comprise a first primary gate attached to the first secondary scaffold part. The first primary gate may be configured to be positioned in an open gate position and a closed gate position. The first primary gate may comprise a first gate locking element and optionally a second gate locking element. The first primary gate in the open gate position may extend in the longitudinal direction such that the first gate locking element engages in a locking configuration with a first primary scaffold locking element of the first primary scaffold part. The first primary gate in the closed gate position may extend in a transverse direction perpendicular to the longitudinal direction such that the first gate locking element and/or the second gate locking element engages in a locking configuration with a first secondary scaffold locking element of the first secondary scaffold part in the closed gate position.

It is a further advantage of the present disclosure that the first primary gate keeps the operator safe from the scaffold opening and keeps the operator at a safe distance from the movable platform during positioning of the movable platform.

The turning device may comprise a first secondary beam connecting the turning mechanism and the first mould. The first scaffold may comprise a first tertiary scaffold part spaced apart from the first secondary scaffold part in the longitudinal direction by a first secondary scaffold opening. The first secondary scaffold opening may be configured to allow the first secondary beam to move therethrough during repositioning of the first mould between the open mould position and the closed mould position. The first secondary scaffold part may be between the first tertiary scaffold part and the first primary scaffold part.

The mould system may further comprise a first secondary movable platform attached to the first mould. The first secondary movable platform may be configured to move between an extended platform position and a stored platform position. The first secondary movable platform may cover the first secondary scaffold opening in the extended position. The first secondary movable platform may be arranged to expose the first secondary scaffold opening in the stored platform position.

The first scaffold may comprise a first secondary gate attached to the first tertiary scaffold part. The first secondary gate may comprise a first gate locking element and optionally a second gate locking element. The first secondary gate may be configured to be positioned in an open gate position and in a closed gate position. The first secondary gate in the open gate position may extend in the longitudinal direction such that the first gate locking element engages in a locking configuration with a first secondary scaffold locking element of the first secondary scaffold part.

The first secondary gate in a closed gate position may extend in a transverse direction perpendicular to the longitudinal direction such that the first gate locking element and/or the second gate locking element engages in a locking configuration with a first tertiary scaffold locking element of the first tertiary scaffold part.

The first primary gate may be configured to rotate about a hinge attached to the first secondary scaffold part. The first secondary gate may be configured to rotate about a hinge attached to the first tertiary scaffold part.

The first primary gate may be positioned in the open gate position while the first primary movable platform is in the extended platform position. The first secondary gate may be positioned in the open gate position while the first secondary movable platform is in the extended platform position. The first primary gate may provide securing of the first primary movable platform by being configured to attach to the scaffold part on each side of the first primary movable platform. The first secondary gate may provide securing of the first secondary movable platform by being configured to attach to the scaffold part on each side of the first secondary movable platform.

The first primary gate may in the open gate position prevent the first primary movable platform to be moved to the stored platform position. The first secondary gate may in the open gate position prevent the first secondary movable platform to be moved to the stored platform position.

The first primary gate and/or the first secondary gate and/or the first tertiary gate may comprise an extendable part. The extendable part may be configured to be positioned in an extended position and a retracted position. The extendable part may be positioned in the retracted position when the first primary gate and/or the first secondary gate and/or the first tertiary gate is positioned in the open gate position. The extendable part may be positioned in the extended position when the first primary gate and/or the first secondary gate and/or the first tertiary gate is positioned in the closed gate position. The extendable part may comprise a plurality of joints joined together in a telescopic manner. The advantage of having an extendable part is that the gate may extend across the entire width, or more, of the scaffold in the closed position, such that the operator is kept safe from the scaffold opening. Furthermore, the extendable part also facilitates blockage of openings of different widths, for example, in case the openings to be blocked by the gate, respectively in the open gate position and the closed gate position, are of different widths.

The first primary movable platform in the extended platform position may be flush with a first primary surface of the first primary scaffold part and a first secondary surface of the first secondary scaffold part. For example, the surface of the first primary movable platform may be flush with the first primary surface of the first primary scaffold part and the first secondary surface of the first secondary scaffold part. The first primary movable platform may rest on shelves on the first primary scaffold part and the first secondary scaffold part in the extended platform position.

The first secondary movable platform in the extended platform position may be flush with a first secondary surface of the first secondary scaffold part and a first tertiary surface of the first tertiary scaffold part. For example, the surface of the first secondary movable platform may be flush with the first secondary surface of the first secondary scaffold part and the first tertiary surface of the first tertiary scaffold part. The first secondary movable platform may rest on shelves on the first secondary scaffold part and the first tertiary scaffold part in the extended platform position.

The first primary movable platform may be configured to rotate about a hinge (e.g., a first hinge) attached to the first mould. The first secondary movable platform may be configured to rotate about a hinge (e.g., a second hinge) attached to the first mould.

The first primary movable platform and/or the first secondary movable platform may be configured to be positioned in the stored platform position during repositioning of the first mould. The first primary movable platform and/or the first secondary movable platform may be positioned in the stored platform position before repositioning of the first mould.

The first primary movable platform and/or the first secondary movable platform may extend in a transverse direction, perpendicular to the longitudinal direction, between a first end and a second end. The hinge may be connected to the first end. At least a part of the second end may be secured to the first mould in the stored platform position. The distance between the first end and second end may correspond to the width of the scaffold in the transverse direction. The distance between the first end and second end of the first primary movable platform may correspond to the width of the first primary scaffold part and/or the width of the first secondary scaffold part in the transverse direction. The distance between the first end and second end of the first secondary movable platform may correspond to the width of the first secondary scaffold part and/or the width of the first tertiary scaffold part in the transverse direction.

The first primary movable platform and/or the first secondary movable platform may be between 0.3-1.5 meters between the first end and the second end, e.g., in the transverse direction. The first scaffold and/or the second scaffold may have a width in the transverse direction between 0.3-1.5 meters in the transverse direction.

The first scaffold and/or the second scaffold may have a length corresponding to the length of the first mould and/or second mould in the longitudinal direction.

The first primary scaffold opening may have a size allowing the first primary beam to move therethrough. The first primary movable platform may have a size such that the first primary scaffold opening is covered in the extended platform position.

The first secondary scaffold opening may have a size allowing the first secondary beam to move therethrough. The first secondary movable platform may have a size such that the first secondary scaffold opening is covered in the extended platform position.

The first primary movable platform and/or the first secondary movable platform each may comprise a platform locking element configured to engage in a locking configuration with a corresponding mould locking element in the stored platform position. The mould locking element may be attached to the first mould. The platform locking element may be arranged at the second end. The platform locking element may comprise a platform bracket comprising an opening. The mould locking element may comprise a mould bracket comprising a pin configured to engage with the opening of the platform bracket. The pin of the mould bracket may be spring loaded.

During handling of the mould system, and after laying up composite material and before repositioning the first mould to the closed mould position, the first primary gate may be positioned in a closed gate position. After positioning the first primary gate in the closed gate position the first primary gate may be secured in the closed gate position. The first primary gate may be secured in the closed gate position with a gate locking element, such as the first gate locking element and/or the second gate locking element.

The first primary gate may be positioned and/or secured in the closed gate position before positioning the movable platform in the stored platform position. In other words, after positioning and/or securing the first primary gate in the closed gate position, the first primary movable platform may be positioned in the stored platform position.

After positioning the first primary movable platform in the stored platform position, the first primary movable platform may be secured in the stored platform position. The first primary movable platform may be secured in the stored platform position with the platform locking element of the first primary movable platform.

After positioning and/or securing the first primary movable platform in the stored platform position, the first secondary gate may be positioned in the closed gate position. After positioning the first secondary gate in the closed gate position the first secondary gate may be secured in the closed gate position. Positioning and securing the first secondary gate in the closed gate position may be performed in the same manner as positioning and securing the first primary gate in the closed gate position.

After positioning and/or securing the first secondary gate in the closed gate position, the first secondary movable platform may be positioned in the stored platform position. After positioning the first secondary movable platform in the stored platform position, the first secondary movable platform may be secured in the stored platform position. The first secondary movable platform may be secured in the stored platform position with the platform locking element of the first secondary movable platform. Positioning and securing the first secondary movable platform in the stored platform position may be performed in the same manner as positioning and securing the first primary movable platform in the stored platform position.

Positioning and securing a gate and positioning and securing a movable platform may be repeated for subsequent gates and movable platforms, e.g., a first tertiary movable platform and/or a first tertiary gate.

After the composite material forming the two blade shell parts of the first mould and second mould have been bonded together to form a wind turbine blade, the first mould may be repositioned to the open mould position, without the first blade shell part. After repositioning the first mould to the open mould position, the first secondary movable platform may be positioned in the extended platform position. The first secondary movable platform may in the extended platform position rest on the shelves of the scaffold. After positioning the first secondary movable platform in the extended platform position, the first secondary gate may be positioned and/or secured in the open gate position. After positioning and/or securing the first secondary gate in the open gate position, the first primary movable platform may be positioned in the extended platform position. The first primary movable platform may in the extended platform position rest on the shelves of the scaffold. After positioning the first primary movable platform in the extended platform position the first primary gate may be positioned and/or secured in the open gate position. Any antecedent platforms and gates, e.g., first tertiary movable platform and/or first tertiary gate, may be handled in the same manner before the first secondary movable platform and first secondary gate are handled.

After repositioning the first mould to the open mould position, and optionally after handling the platforms and gates, the wind turbine blade may be removed from the mould system. After removing the moulded wind turbine blade the mould system may be used to manufacture another wind turbine blade by repeating the disclosed method.

The first primary movable platform and/or the first secondary movable platform may each comprise a handle. The handle may assist the operator in positioning the first primary movable platform and/or the first secondary movable platform between the extended platform position and the stored platform position. The handle may be arranged at the second end.

A bias element may be attached to each of the first primary movable platform and/or the first secondary movable platform. A first end of the bias element may be attached to the first primary movable platform and/or first secondary movable platform. A second end of the bias element may be attached to the first mould. The bias element may be a pneumatic actuator or a gas spring assisting the operator in positioning the first primary movable platform and/or first secondary movable platform in the extended platform position and/or the stored platform position. For example, the bias element may provide for a smooth positioning of the first primary movable platform and/or first secondary movable platform into the extended platform position and/or the stored platform position.

A second scaffold may be arranged between the first mould and the second mould in the open mould position. The second scaffold may extend along the longitudinal axis. The first scaffold may be arranged proximate the first mould. The second scaffold may be arranged proximate the second mould. The turning device may be arranged between the first scaffold and the second scaffold.

The first scaffold and/or second scaffold may be secured to the ground or floor, e.g., the ground or floor of the manufacturing plant. The first scaffold, e.g., the first scaffold part and/or the second scaffold part, may be bolted to the floor or ground.

The mould system may comprise a third scaffold and a fourth scaffold. The third scaffold may be arranged such that the first scaffold extends on one side of the first mould and the third scaffold extends on the opposite side of the first mould. The fourth scaffold may be arranged such that the second scaffold extends on one side of the second mould and the fourth scaffold extends on the opposite side of the second mould.

The first scaffold and/or the second scaffold may each comprise a handrail. The first primary gate and/or the first secondary gate may be attached to the handrail of the first scaffold, e.g., the first secondary scaffold part and/or the first tertiary scaffold part.

The mould system may comprise a plurality of movable platforms, including the first primary movable platform and the first secondary movable platform, such as three or four movable platforms. The plurality of movable platforms may comprise similar features.

The mould system may comprise a plurality of gates, including the first primary gate and the first secondary gate, such as three or four gates. The mould system may comprise a gate on each side of the movable platform. The plurality of gates may comprise similar features.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
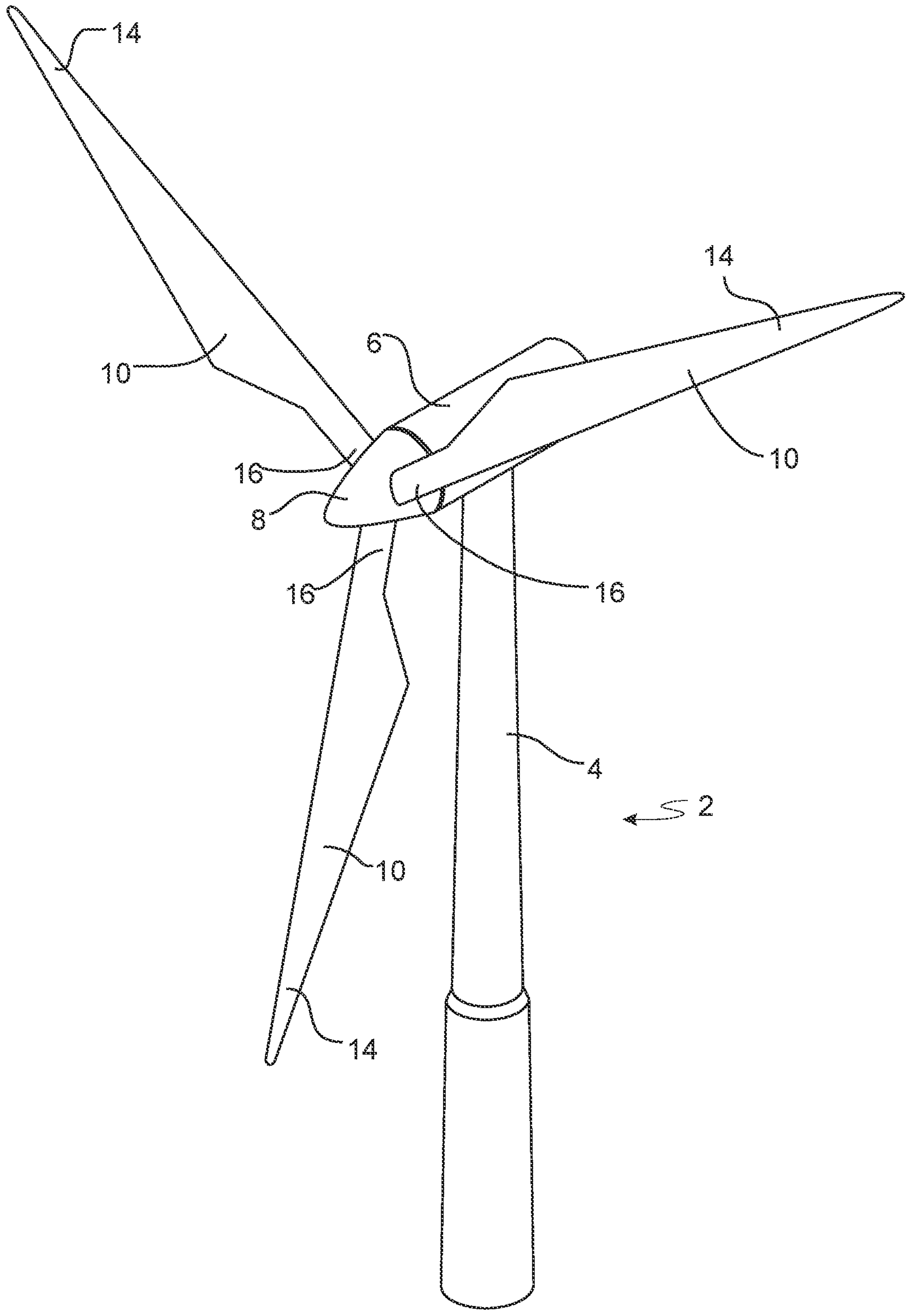
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
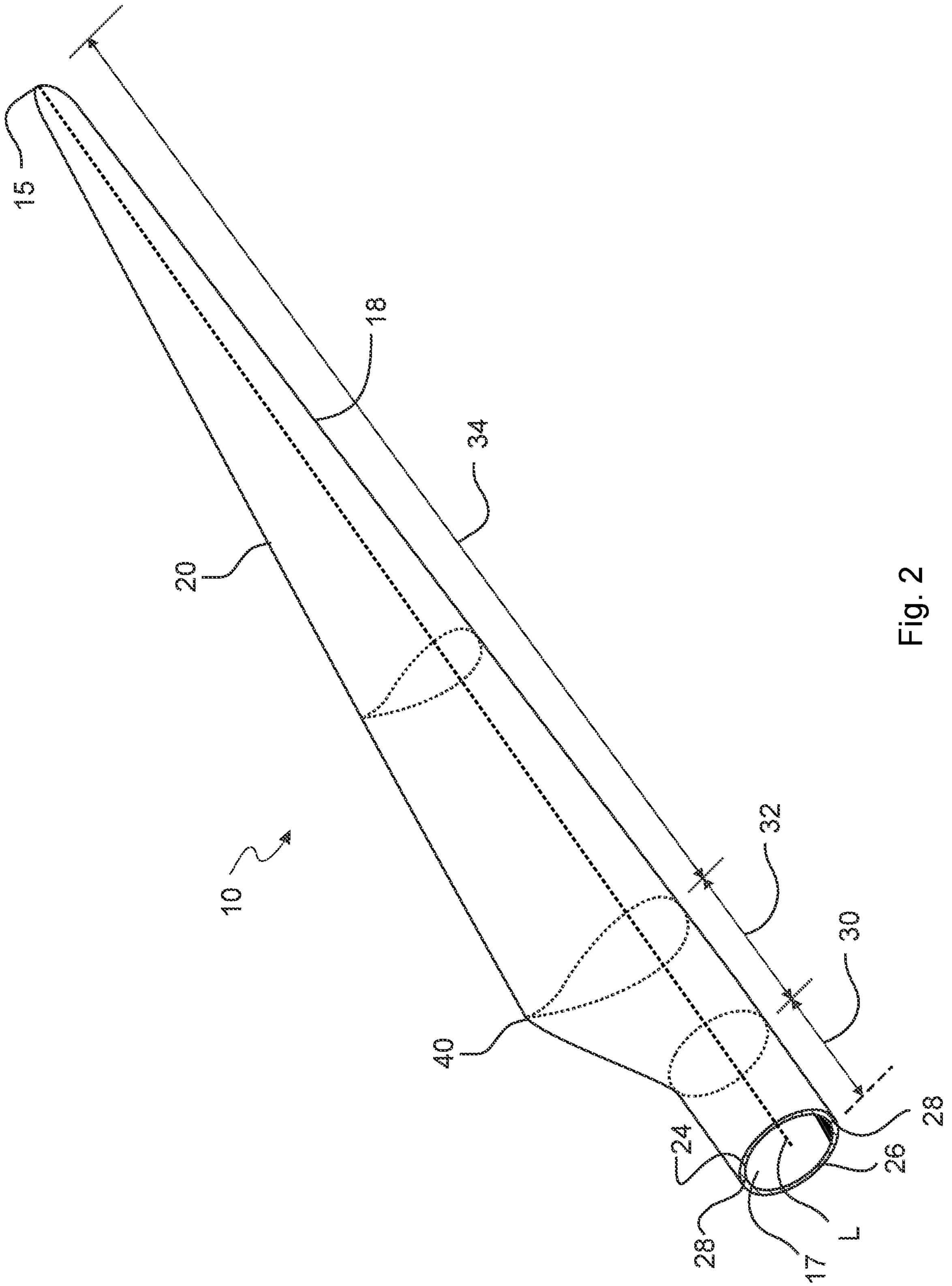
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
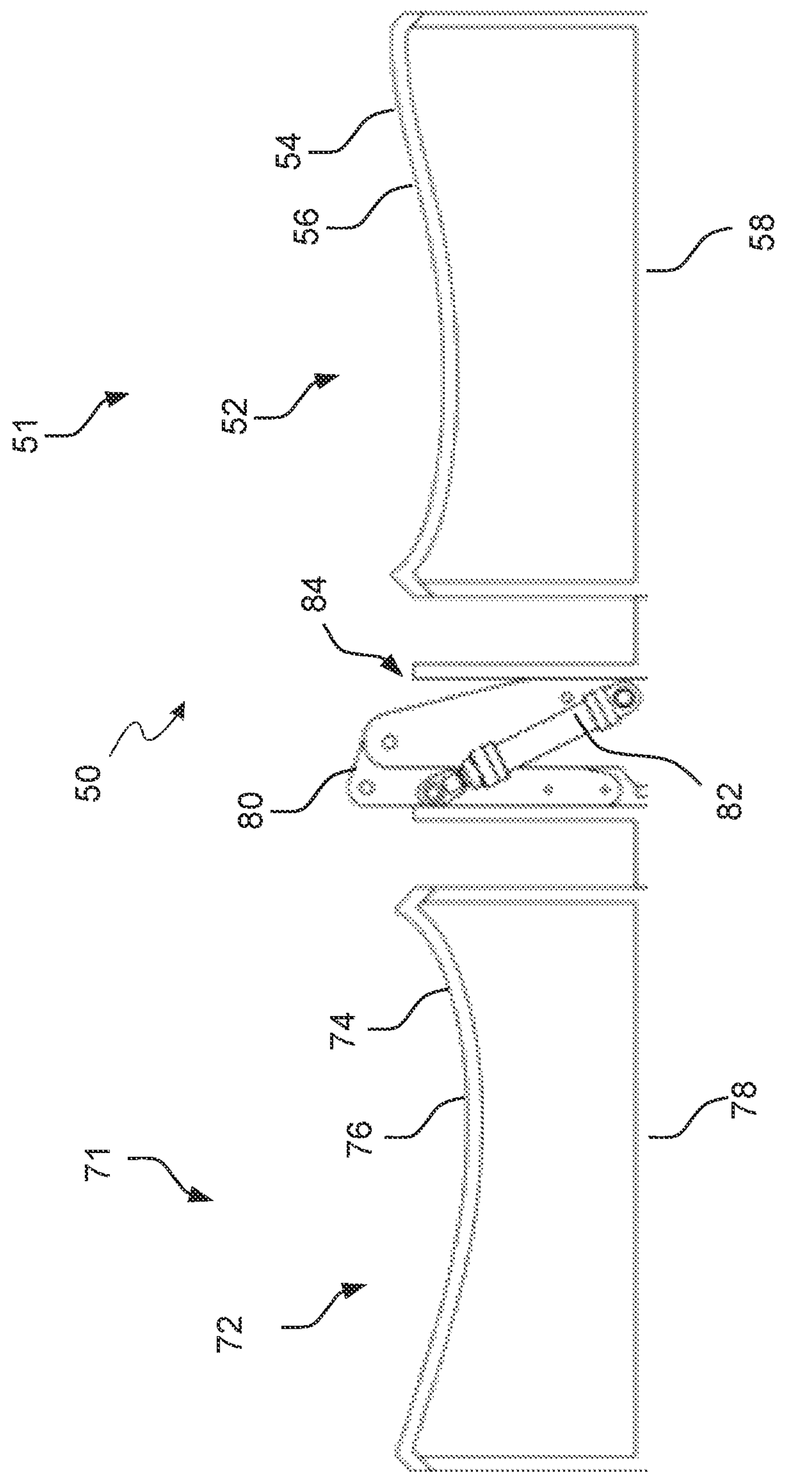
FIG. 3 is a schematic diagram illustrating an exemplary mould system.

FIG. 3 is a schematic diagram illustrating in a perspective view an exemplary mould system for moulding a blade shell of a wind turbine blade, such as a mould system for manufacturing the wind turbine blade of FIGS. 1-2. The mould system 50 comprises a first mould system section 51 and a second mould system section 71. The first mould system section 51 comprises a first mould 52 configured for manufacturing a first blade shell part of a wind turbine blade, such as the first blade shell part 24 of FIG. 2. The first mould 52 has a first non-moulding side 58 opposite a first moulding side 54. The first moulding side 54 has a first moulding surface 56 configured to define an outer shape of the first blade shell part 24. The second mould system section 71 comprises a second mould 72 configured for manufacturing a second blade shell part of a wind turbine blade, such as the second blade section 26 of FIG. 2. The second mould 72 has a second non-moulding side 78 opposite a second moulding side 74. The second moulding side 74 has a second moulding surface 76 configured to define an outer shape of the second blade shell part 26.

The mould system 50 further comprises a turning device 80 configured for repositioning the first mould 52 between an open mould position (as illustrated) and a closed mould position, e.g., by lifting and rotating the first mould 52. The turning device 80 comprises a turning mechanism 82 and a beam 84 connecting the turning mechanism and the first mould.

In FIG. 3 the mould system 50 is illustrated in an open mould position where the first mould 52 is arranged next to the second mould 72 such the first moulding side 54 of the first mould 52 and the second moulding side 74 of the second mould 54 are facing the same direction, e.g., upwards. In the closed mould position (as illustrated in FIG. 5*d*) the first mould 52 is arranged on top of the second mould 72 such that a first moulding side 54 of the first mould 52 is facing the second moulding side 74 of the second mould 72.

In the following, a reference number without a subsequent apostrophe (e.g., 112) may be used to refer to any of a plurality of similar elements or features, individually referenced by the same reference number with an apostrophe (e.g., 112', 112", 112'", 112"), i.e., the reference without an apostrophe is used to refer to any of the corresponding reference with apostrophes.

Figure 4:
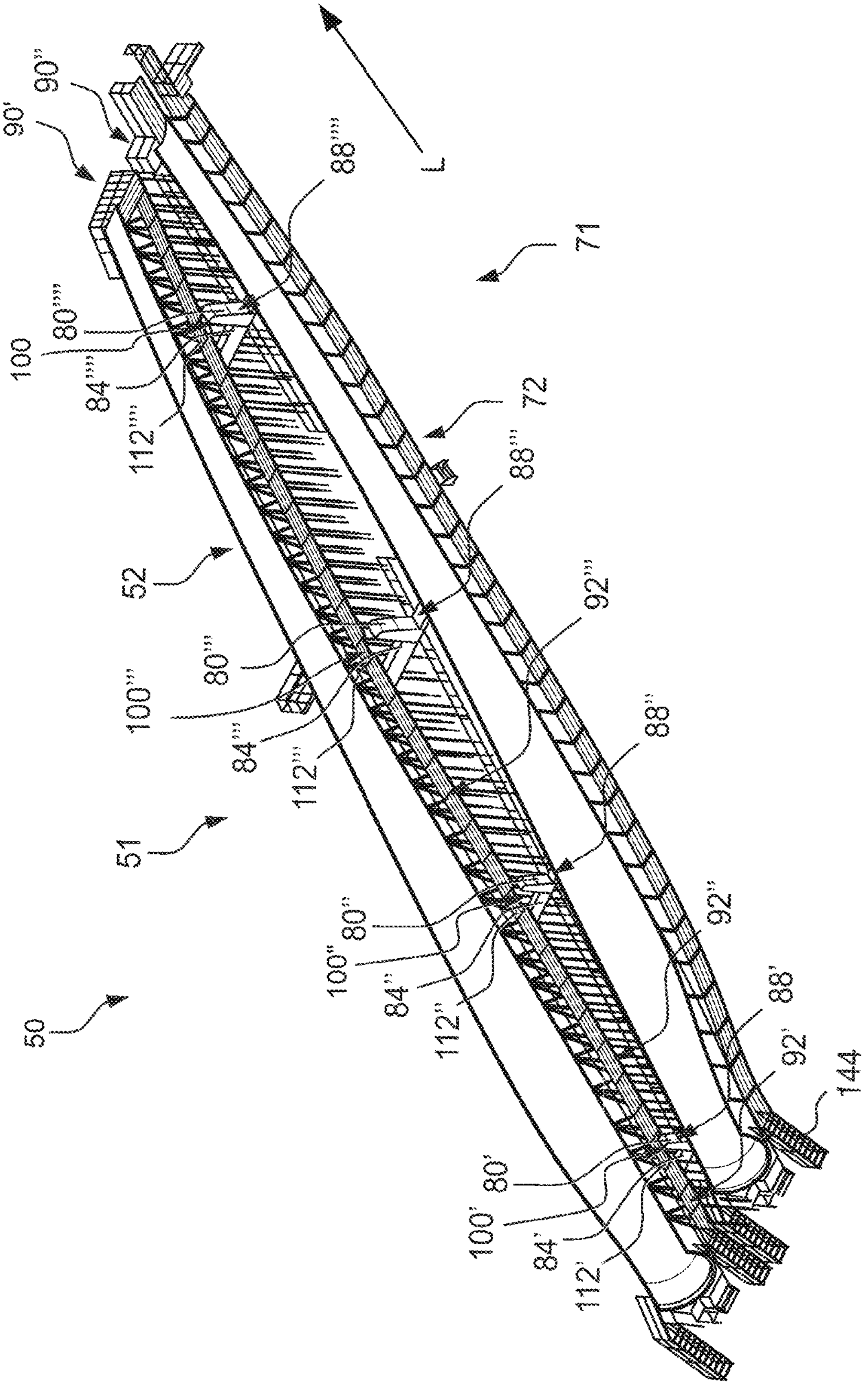
FIG. 4 is a schematic diagram illustrating an exemplary mould system.

FIG. 4 is a schematic diagram illustrating an exemplary mould system 50, such as the mould system of FIG. 3, for manufacturing a wind turbine blade 10. The mould system 50 comprises a first mould system section 51 comprising a first mould 52 and a second mould system section 71 comprising a second mould 72. A first scaffold 90' is arranged between the first mould 52 and the second mould 72 in the open mould position and extends in the longitudinal direction L. A second scaffold 90" is arranged between the first mould 52 and the second mould 72 and extends along the longitudinal axis L. The first scaffold 90' is arranged proximate the first mould 52 and the second scaffold 90" is arranged proximate the second mould 72. The scaffolds are used during the lay-up of layers forming the wind turbine blade or during inspection of the shells. An operator may enter the system through the stairs 144 and walk along the moulds 52, 72 on the scaffolds 90. The scaffolds are secured to the floor or the ground of the manufacturing halls, e.g., by bolting.

One or more turning devices 80 are arranged between the first scaffold 90' and the second scaffold 90" and comprises at least one beam 84. The first mould system section 51 has a plurality of handling sections 88 (four in the illustrated example) each comprising a turning device 80, a beam 84, a scaffold opening 100 and a movable platform 112 covering the respective scaffold openings 100.

The movable platforms 112 are attached to the first mould 52 and are configured to move between an extended platform position and a stored platform position. The movable platforms 112 are configured to rotate about a hinge attached to the first mould 52. In FIG. 4 the movable platforms 112 are illustrated in an extended platform position where the movable platforms 112 cover the scaffold openings 100. In the stored platform position the movable platforms 112 are arranged to expose the scaffold opening 100.

The first scaffold 90' comprises a first primary scaffold part 92' and a first secondary scaffold part 92" spaced apart by a first primary scaffold opening 100'. In the illustrated example, the first scaffold 90' further comprises a first tertiary scaffold part 92'", wherein the first secondary scaffold part 92" and the first tertiary scaffold part 92'" are spaced apart by a first secondary scaffold opening 100". In the illustrated example, the first scaffold 90' comprises further scaffold parts spaced apart by scaffold openings.

At the first primary handling section 88' the first scaffold 90' comprises the first primary scaffold part 92' and the first secondary scaffold part 92" spaced apart in the longitudinal direction L by the first primary scaffold opening 100'. The first primary scaffold opening 100' is configured to allow the first primary beam 84' to move therethrough during repositioning of the first mould 52 between the open mould position and the closed mould position. The same principle applies to the first secondary handling section 88", the first tertiary handling section 88'" and the first quaternary handling section 88".

FIGS. 5*a*-5*d* are schematic diagrams illustrating an exemplary handling section of a mould system, such as a handling section of the mould system of FIGS. 3-5. The following description will be based on the first primary handling section 88', however the same principles applies to the other handling sections 88", 88'", 88'". The first primary handling section 88' comprises a section of the scaffold 90 comprising two scaffold parts 92 with surfaces 94, e.g., a first primary scaffold part 92' with a first primary surface 94' and a first secondary scaffold part 92" with a first secondary surface 94". The first primary handling section 88' further comprises a first movable platform 112', arranged between the two surfaces 94 of the scaffold parts 92 and attached to the first mould 52. The first primary handling section 88' comprises a first primary gate 130', attached to the first secondary scaffold part 92" and rotatable about a hinge 110 on the first secondary scaffold part 92". The first primary movable platform 112' comprises a handle 122, which the operator can use to assist positioning of the movable platform 112'.

Figure 5A:
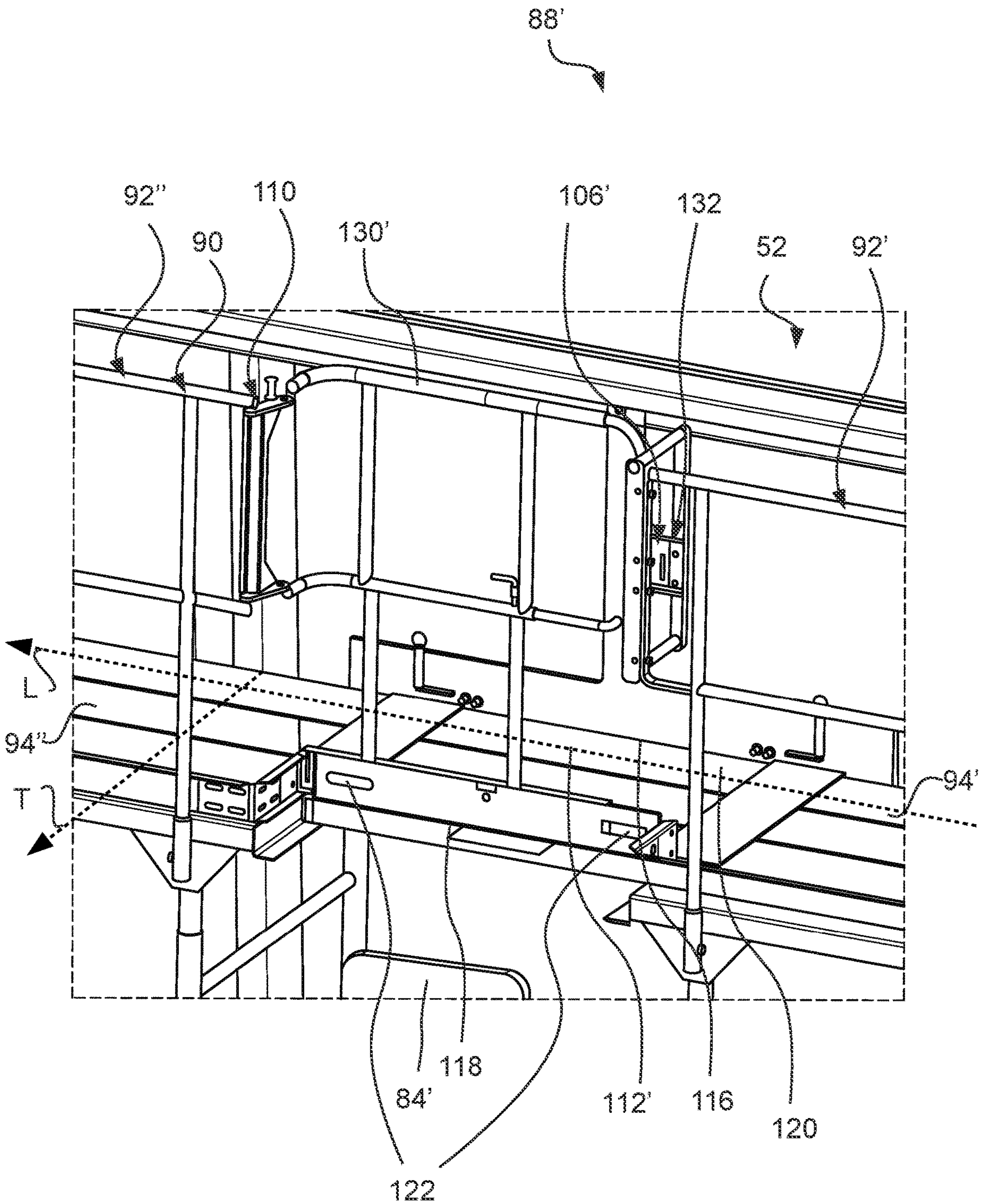
FIGS. 5*a*-5*d* are schematic diagrams illustrating an exemplary handling section of a mould system.

In FIG. 5*a*, the first primary movable platform 112' is illustrated in an extended platform position. The first primary platform 112' extends in a transverse direction T, perpendicular to the longitudinal direction L between a first end 116 and a second end 118. The first primary platform 112' is connected to the first mould 52 by a hinge (not illustrated) at the first end 116. In the extended platform position (as illustrated) the first primary movable platform 112' is arranged such that the surface 120 of the first primary movable platform is flush with the surfaces 94, e.g., the first primary surface 94' and the first secondary surface 94".

The first primary gate 130' is positioned in an open gate position where the first primary gate 130' extends in the longitudinal direction. A gate locking element 132 of the first primary gate 130' engages in a locking configuration with a first primary scaffold locking element 106' of the first primary scaffold part 92'. The gate locking element 132 may comprise a bracket comprising an opening and the first primary scaffold locking element 106' may comprise a bracket comprising a pin, such as a spring bolt. Other suitable locking configurations may also be used.

Figure 5B:
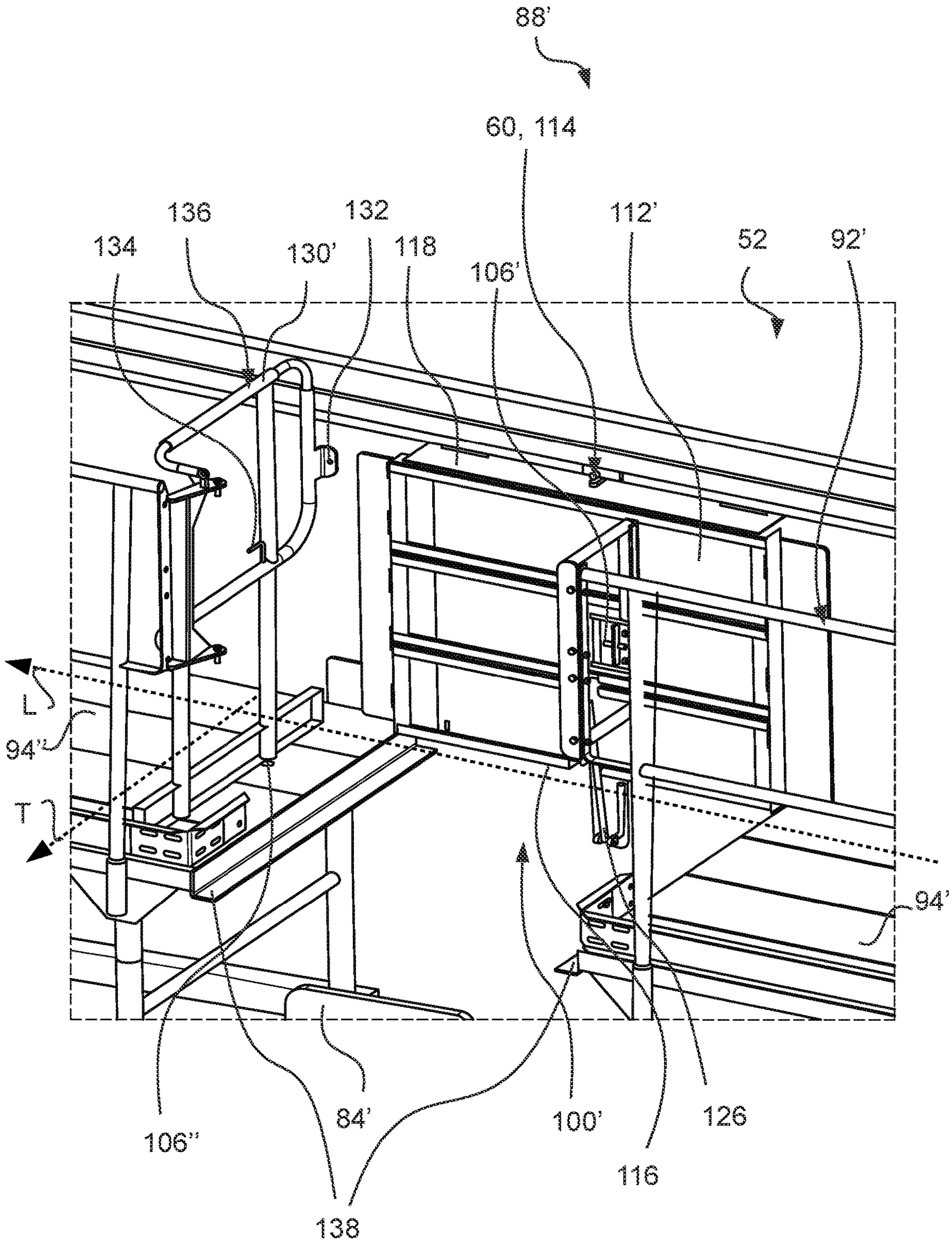

In FIG. 5*b* the first primary movable platform 112' is in a closed gate position where the first primary gate 130' extends in a transverse direction T perpendicular to the longitudinal direction L. The first primary movable platform 112' is rotated about a hinge at the first end 116 to position the first primary movable platform 112' in the stored platform position. The first primary platform 112' comprises a platform locking element 114 at the second end 118 configured to engage in a locking configuration with a mould locking element 60 attached to the first mould 52, and thereby securing the first primary movable platform 112' to the first mould 52. The platform locking element 114 may comprise a platform bracket comprising an opening and the mould locking element 60 may comprise a mould bracket comprising a pin, such as a spring bolt, configured to engage with the opening of the platform bracket. In the stored platform position the first primary movable platform 112' exposes the first primary scaffold opening 100'. The first primary scaffold opening 100' allows the first primary beam 84' to move therethrough during repositioning of the first mould 52 between the open mould position and the closed mould position.

The first primary gate 130' may comprise an extendable part 136. The extendable part 136 may be positioned in an extended position and a retracted position. The extendable part 136 is useful in the case where the first primary gate 130' extends across the first primary movable platform 112' in the open gate position from the first primary scaffold part 92' to the first secondary scaffold part 92" (as illustrated in FIG. 5*a*) but may not be able to extend across the entire width of the first secondary scaffold part 92" in the retracted position in the closed gate position. In FIG. 5*a* the extendable part 136 is in the retracted position and in FIG. 5*b* the extendable part 136 is positioned in the extended position to compensate for missing extent, such that the entire width of the scaffold is closed off.

A second gate locking element 134 engages in a locking configuration with a first secondary scaffold locking element 106" of the first secondary scaffold part 92" in the closed gate position, e.g., when the extendable part 136 is in the extended position. The first secondary locking element 106" may be an opening in the first secondary scaffold part 92", such as an opening in the first secondary surface 94".

A bias element 126 may be connected between the first primary movable platform 112' and the first mould 52 to assist the operator in positioning the first primary movable platform 112' between the extended platform position and the stored platform position. The bias element 126 may be a pneumatic actuator or a gas spring supporting the positioning to the stored platform position. The first primary movable platform 120' in the extended platform position may rest on shelves 138 attached to the first primary scaffold part 94' and the first secondary scaffold part 94".

In the extended platform position of FIG. 5*a* the operators can walk along the scaffold 90 during lay-up of the layers forming each of the blade shell parts of the wind turbine blade or during inspection of the blade shell parts. The first primary gate 130' secures the first primary movable platform 112' such that the operator is prevented from falling into the first primary scaffold opening 100'.

Figure 5C:
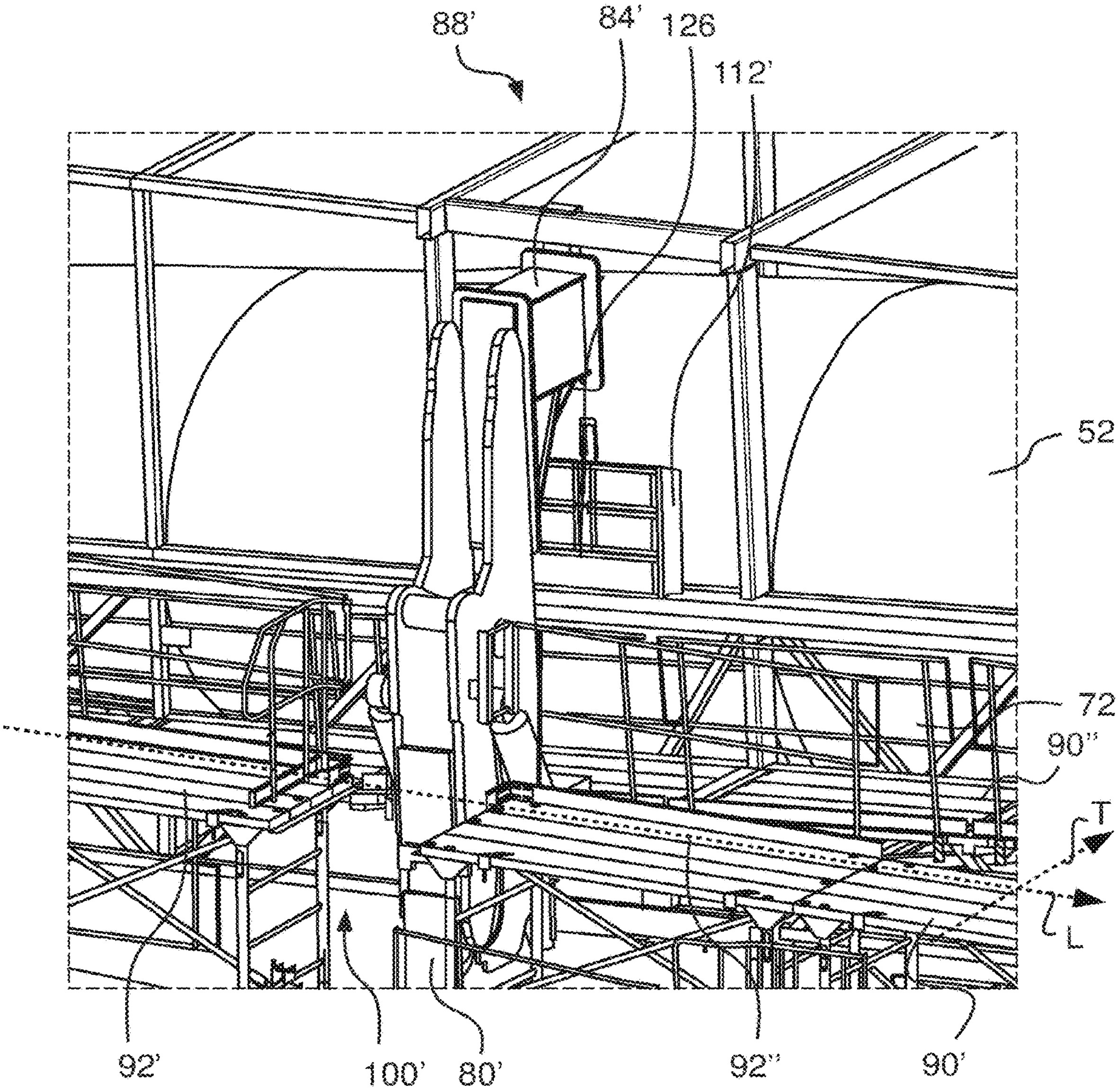
Figure 5D:
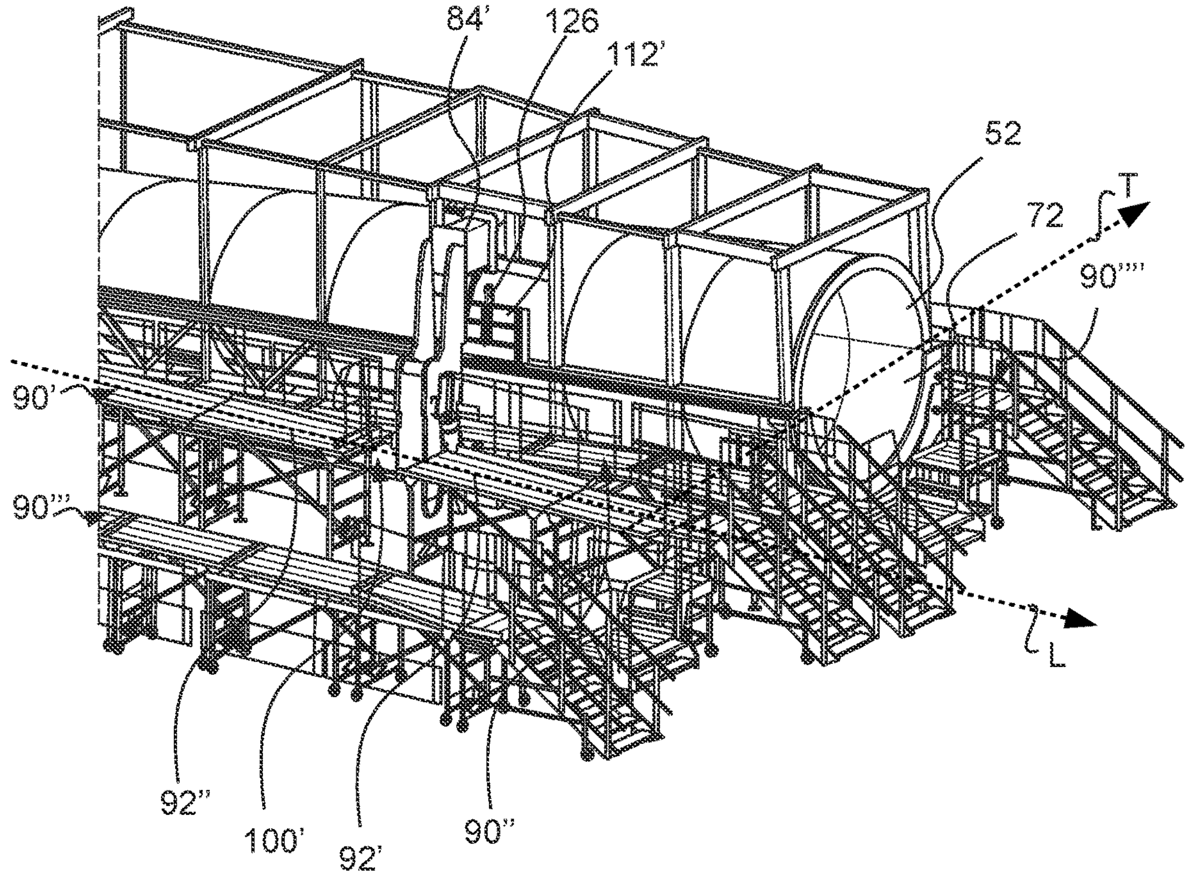

During handling of the mould system 50 the operator will start the handling process in the extended platform position, such as illustrated in FIG. 5*a*. The operator may enter the first scaffold 90' from the stairs (illustrated in FIGS. 4 and 5*d*) extending from the first primary scaffold part 92'. After entering the first scaffold 90' the operator may provide a stopper, e.g., a no trespassing sign, signalling that the first scaffold 90' should not be entered for safety reasons. The operator will then walk from the first primary scaffold part 92', across the first primary movable platform 112', and over to the first secondary scaffold part 92". The operator will then, while being in the first secondary scaffold part 92", position the first primary gate 130' from the open gate position to the closed gate position and secure the gate in the closed gate position (as illustrated in FIG. 5*b*). The operator will then reposition the first primary movable platform 112' from the extended platform position to the stored platform position and secure the first primary movable platform 112' in the stored platform position. The operator continues over the first secondary movable platform and repeat the same steps. The operator will repeat the steps for all handling sections 88 along the first scaffold 90'. When all the handling sections 88 are handled, i.e., when all gates are closed and platforms are positioned in the stored platform position, the first mould 52 is repositioned to the closed mould position as illustrated in FIG. 5*c*. The first primary gate 130' also prevents the operator from being trapped between the first primary beam 84' and the moulds 52, 54, especially during repositioning.

In FIG. 5*c* the first mould 52 has been repositioned by the first primary turning device 80' into the closed mould position such that the first mould 52 is arranged on top of the second mould 72. The first primary beam 84' has moved through the first primary scaffold opening 100'. The first primary movable platform 112' which is attached to the first mould 52 has moved together with the first mould 52 and is now arranged on the side of the first mould 52.

FIG. 5*d* illustrates a mould system in the closed mould position, such as the mould system of FIG. 5*c* in a larger scale. The first mould 52 is repositioned into the closed mould position by lifting and rotating the first mould 52. The first primary beam 84' has moved through the first primary scaffold opening 100' of the first scaffold 90'. Also illustrated in FIG. 5*d* is a third scaffold 90'" arranged such that the first scaffold 90' extends on one side of the first mould 52 and the third scaffold 90'" extends on the opposite side of the first mould 52. A fourth scaffold 90'" is arranged such that the second scaffold 90" extends on one side of the second mould 72 and the fourth scaffold extends on the opposite side of the second mould 72.

Figure 6:
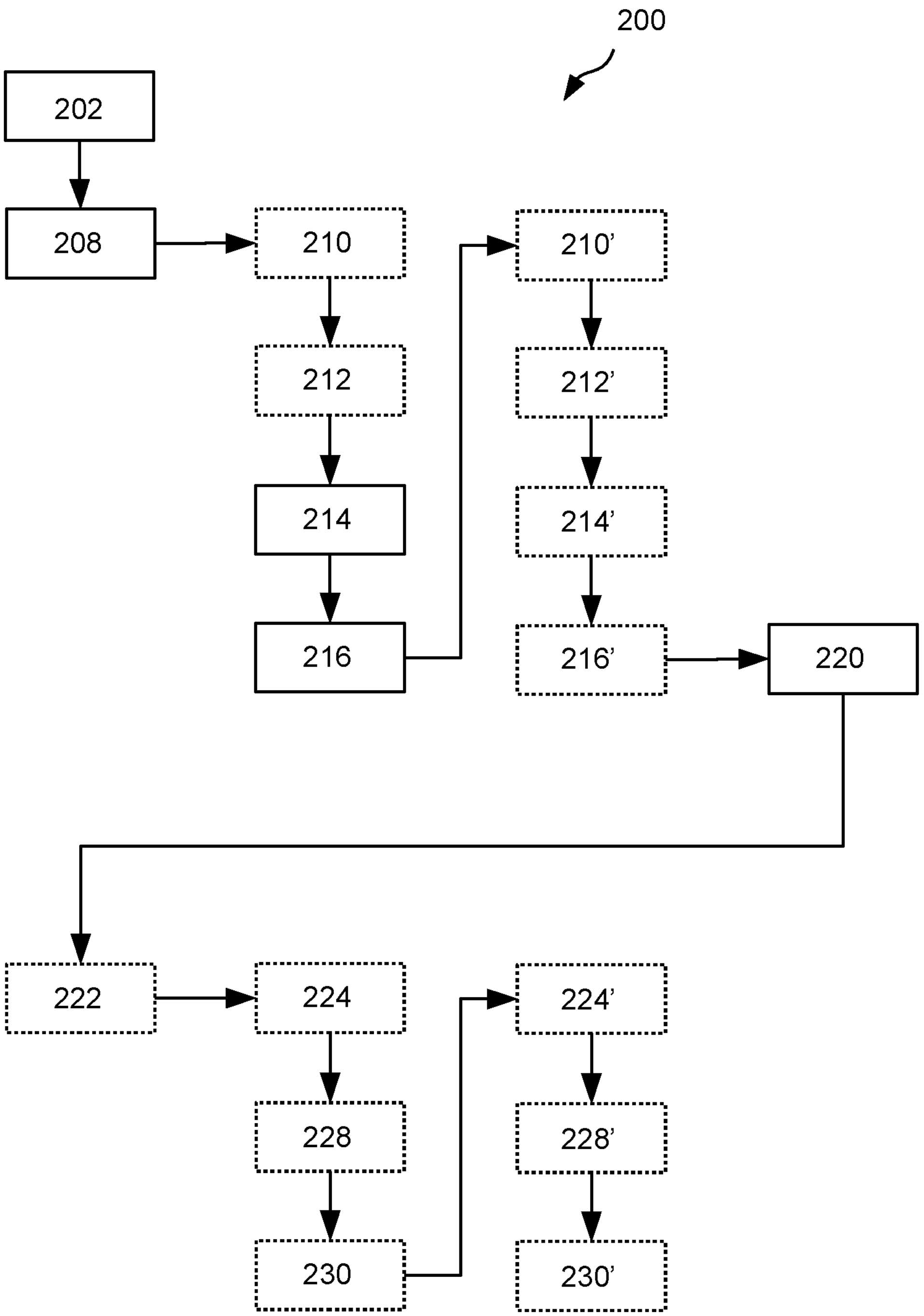
FIG. 6 is a block diagram illustrating an exemplary method for handling a mould system for manufacturing a wind turbine blade.

FIG. 6 is a block diagram illustrating an exemplary method 200 for handling a mould system for manufacturing a wind turbine blade, such as the mould system of FIGS. 3-5 for manufacturing a wind turbine blade of FIGS. 1-2.

The method 200 comprises providing 202 a mould system, such as the mould system of FIGS. 3-5, wherein the first mould is in the open mould position and the first primary movable platform is in the extended platform position. The first primary gate may be in the open gate position while the first primary movable platform is in the extended platform position.

The method 200 comprises laying up 208 composite material in the first mould and the second mould. The composite material may be laid up by an operator moving along the scaffold of the mould system.

The method 200 may comprise positioning 210 and securing 212 the first primary gate in a closed gate position. The first primary gate may be secured in the closed gate position with the gate locking element and the scaffold locking element.

After positioning 210 the first primary gate in the closed gate position, the method 200 comprises positioning 214 the first primary movable platform in the stored platform position. The first primary gate may be positioned 210 and secured 212 before positioning 214 the movable platform in the stored platform position.

After positioning 214 the first primary movable platform in the stored platform position, the method 200 comprises securing 216 the first primary movable platform in the stored platform position with the platform locking element and the mould locking element.

After positioning 214 the first primary movable platform in the stored platform position, the method 200 may comprise positioning 210' and securing 212' the first secondary gate in closed gate position. Positioning 210' and securing 212' the first secondary gate in the closed gate position may be performed in the same manner as positioning 210 and securing 212 the first primary gate in the closed gate position.

After positioning the first secondary gate in the closed gate position, the method 200 may comprise positioning 214' and securing 216' the first secondary movable platform in stored platform position. Positioning 214' and securing 216' the first secondary movable platform in stored platform position may be performed in the same manner as positioning 214 and securing 216 the first primary movable platform in the stored platform position.

Positioning and securing a gate and positioning and securing a movable platform may be repeated for subsequent gates and movable platforms.

The method 200 comprises repositioning 220 the first mould to the closed mould position by lifting and rotating the first mould and positioning the first mould on top of the second mould.

After the two blade shell parts of the first mould and second mould have been bonded together to form a wind turbine blade, the first mould may be repositioned 222 to the open mould position. After repositioning 222 the first mould, the first secondary movable platform may be positioned 224 in the extended platform position. The first secondary movable platform will in this position rest on the shelves of the scaffold. The first secondary gate may be positioned 228 and secured 230 in the open gate position. Then the first primary movable platform may be positioned 224 in the extended platform position and the first primary gate may be positioned 228' and secured 230' in the open gate position. Any antecedent platforms and gates may be handled in the same manner before the first secondary movable platform and first secondary gate are handled.

After removing the moulded wind turbine blade the mould system is now ready for manufacturing another wind turbine blade by repeating above steps.

The invention has been described with reference to preferred embodiments. However, the scope of the invention is not limited to the illustrated embodiments, and alterations and modifications can be carried out without deviating from the scope of the invention.

LIST OF REFERENCES

2 wind turbine
4 tower
6 nacelle
8 hub
10 blade
12 blade part
14 blade tip
15 tip end
16 blade root
17 root end
18 leading edge
20 trailing edge
24 first blade shell part (pressure side)
25 leading part of pressure side
26 second blade shell part (suction side)
27 leading part of suction side
28 bond lines/glue joints
30 root region
32 transition region
34 airfoil region
36 first shell part flange
38 chord line
40 shoulder
50 mould system
51 first mould system section
52 first mould
54 first moulding side
56 first moulding surface
58 first non-moulding side
60 mould locking element
62 mould bracket
64 pin
71 second mould system section
72 second mould
74 second moulding side
76 second moulding surface
78 second non-moulding side
80 turning device
80' first primary turning device
80" first secondary turning device
80'" first tertiary turning device
80'" first quaternary turning device
82 turning mechanism
84 beam
84' first primary beam
84" first secondary beam
84'" first tertiary beam
84'" first quaternary beam
88 handling section
88' first primary handling section
88" first secondary handling section
88'" first tertiary handling section
88'" first quaternary handling section
90 scaffold
90' first scaffold
90" second scaffold
90'" third scaffold
90'" fourth scaffold
92 scaffold part
92' first primary scaffold part
92" first secondary scaffold part
92'" first tertiary scaffold part
94' first primary surface
94" first secondary surface
100 scaffold opening
100' first primary scaffold opening
100" first secondary scaffold opening
100'" first tertiary scaffold opening
100'" first quaternary scaffold opening
106 scaffold locking element
106' first primary scaffold locking element
108 first secondary locking element
110 hinge
112 movable platform
112' first primary movable platform
112" first secondary movable platform
114 platform locking element
116 first end
118 second end
120 surface
122 handle
126 bias element
130 gate
130' first primary gate
130" first secondary gate
132 first gate locking element
134 second gate locking element
136 extendable part
138 shelf
140 floor
144 stairs
L longitudinal direction
T transverse direction

200 method for handling a mould system
202 providing mould system
208 laying up composite material in first mould and second mould
210 positioning first primary gate in closed gate position
212 securing the first primary gate in closed gate position
214 positioning first primary movable platform in stored platform position
216 securing first primary movable platform in stored platform position
210' positioning the first secondary gate in closed gate position
212' securing the first secondary gate in closed gate position
214' positioning the first secondary movable platform in stored platform position
216' securing the first secondary movable platform in the stored platform position
220 repositioning the first mould to closed mould position
222 repositioning the first mould to open mould position
224 positioning the first secondary movable platform in extended platform position
228 positioning first secondary gate in open gate position
230 securing the first secondary gate in open gate position
224' positioning the first primary movable platform in extended platform position
228' positioning first primary gate in open gate position
230' securing the first primary gate in open gate position

The invention claimed is:

1. A mould system for moulding a blade shell of a wind turbine blade, the mould system comprising:

a first mould for manufacturing a first blade shell part of the wind turbine blade, the first mould substantially extending along a longitudinal axis;

a second mould for manufacturing a second blade shell part of the wind turbine blade, the second mould substantially extending along the longitudinal axis;

a turning device configured to reposition the first mould between an open mould position and a closed mould position, wherein the first mould is arranged next to the second mould in the open mould position, and wherein the first mould is arranged on top of the second mould in the closed mould position, the turning device comprising a turning mechanism and a first primary beam connecting the turning mechanism and the first mould;

a first scaffold arranged between the first mould and the second mould in the open mould position, the first scaffold extending along the longitudinal axis, and wherein the first scaffold comprises a first primary scaffold part and a first secondary scaffold part spaced apart in the longitudinal direction by a first primary scaffold opening, the first primary scaffold opening being configured to allow the first primary beam to move therethrough during repositioning of the first mould between the open mould position and the closed mould position;

a first primary movable platform attached directly to the first mould and being configured to move between an extended platform position and a stored platform position, and wherein the first primary movable platform covers the first primary scaffold opening in the extended position and wherein the first primary movable platform is arranged to expose the first primary scaffold opening in the stored platform position.

2. The mould system according to claim 1, wherein the first primary movable platform, in the extended platform position, is flush with a first primary surface of the first primary scaffold part and a first secondary surface of the first secondary scaffold part.

3. The mould system according to claim 1, wherein the first primary movable platform is configured to rotate about a hinge attached to the first mould.

4. The mould system according to claim 1, wherein the first primary movable platform is configured to be positioned in the stored platform position during repositioning of the first mould.

5. The mould system according to claim 3, wherein the first primary movable platform extends in a transverse direction, perpendicular to the longitudinal direction, between a first end and a second end, and wherein the hinge is connected to the first end, and wherein at least a part of the second end is secured to the first mould in the stored platform position.

6. The mould system according to claim 1, wherein the first primary movable platform comprises a platform locking element configured to engage in a locking configuration with a mould locking element in the stored platform position.

7. The mould system according to claim 6, wherein the platform locking element comprises a platform bracket comprising an opening and wherein the mould locking element comprises a mould bracket comprising a pin configured to engage with the opening of the platform bracket.

8. The mould system according to claim 1, wherein the first scaffold comprises a first primary gate attached to the first secondary scaffold part and being configured to be positioned in an open gate position and a closed gate position, the first primary gate comprising a first gate locking element and optionally a second gate locking element, and wherein the first primary gate in the open gate position extends in the longitudinal direction such that the first gate locking element engages in a locking configuration with a first primary scaffold locking element of the first primary scaffold part, and wherein the first primary gate in the closed gate position extends in a transverse direction perpendicular to the longitudinal direction such that the first gate locking element and/or the second gate locking element engages in a locking configuration with a first secondary scaffold locking element of the first secondary scaffold part in the closed gate position.

9. The mould system according to claim 8, wherein the first primary gate is configured to rotate about a hinge attached to the first secondary scaffold part.

10. The mould system according to claim 1, wherein the turning device comprises a first secondary beam connecting the turning mechanism and the first mould, wherein the first scaffold comprises a first tertiary scaffold part spaced apart from the first secondary scaffold part in the longitudinal direction by a first secondary scaffold opening, the first secondary scaffold opening being configured to allow the first secondary beam to move therethrough during repositioning of the first mould between the open mould position and the closed mould position, wherein the mould system further comprises a first secondary movable platform attached to the first mould and being configured to move between an extended platform position and a stored platform position, and wherein the first secondary movable platform covers the first secondary scaffold opening in the extended position and wherein the first secondary movable platform is arranged to expose the first secondary scaffold opening in the stored platform position, wherein the first scaffold comprises a first secondary gate attached to the first tertiary scaffold part, the first secondary gate comprising a first gate locking element and optionally a second gate locking element, and being configured to be positioned in an open gate position and in a closed gate position, where the first secondary gate in the open gate position extends in the longitudinal direction such that the first gate locking element engages in a locking configuration with a first secondary scaffold locking element of the first secondary scaffold part, and where the first secondary gate in a closed gate position extends in a transverse direction perpendicular to the longitudinal direction such that the first gate locking element and/or the second gate locking element engages in a locking configuration with a first tertiary scaffold locking element of the first tertiary scaffold part.

11. The mould system according to claim 1, wherein the first scaffold is secured to the ground or floor.

12. The mould system according to claim 1, further comprising a second scaffold arranged between the first mould and the second mould in the open mould position, the second scaffold extending along the longitudinal axis, wherein the first scaffold is arranged proximate the first mould and the second scaffold is arranged proximate the second mould and wherein the turning device is arranged between the first scaffold and the second scaffold.

13. The mould system according to claim 1, wherein the first mould has a first moulding side with a first moulding surface configured to define an outer shape of the first blade shell part and a first non-moulding side opposite the first moulding side, and wherein the second mould has a second moulding side with a second moulding surface configured to define an outer shape of the second blade shell part and having a second non-moulding side opposite the second moulding side, and wherein the first mould and the second mould are arranged such that the first moulding side of the first mould and the second moulding side of the second mould are facing the same direction in the open mould position, and wherein the first moulding side of the first mould is facing the second moulding side of the second mould in the closed mould position.

14. A method for handling a mould system for manufacturing a wind turbine blade, the method comprising:

providing a mould system according to claim 1, wherein:

the first mould is in the open mould position, and the first primary movable platform is in the extended platform position, laying up composite material in the first mould and the second mould, positioning the first primary movable platform in the stored platform position, securing the first primary movable platform in the stored platform position, repositioning the first mould to the closed mould position.

15. The method according to claim 14, wherein:

the first scaffold comprises a first primary gate attached to the first secondary scaffold part and being configured to be positioned in an open gate position and a closed gate position, the first primary gate comprising a first gate locking element and optionally a second gate locking element, and wherein the first primary gate in the open gate position extends in the longitudinal direction such that the first gate locking element engages in a locking configuration with a first primary scaffold locking element of the first primary scaffold part, and wherein the first primary gate in the closed gate position extends in a transverse direction perpendicular to the longitudinal direction such that the first gate locking element and/or the second gate locking element engages in a locking configuration with a first secondary scaffold locking element of the first secondary scaffold part in the closed gate position, and the first primary gate is in the open gate position while the first primary movable platform is in the extended platform position.

16. The method according to claim 15, comprising positioning and/or securing the first primary gate in the closed gate position before positioning the movable platform in the stored platform position.

17. The method according to claim 16, wherein:

the turning device comprises a first secondary beam connecting the turning mechanism and the first mould, the first scaffold comprises a first tertiary scaffold part spaced apart from the first secondary scaffold part in the longitudinal direction by a first secondary scaffold opening, the first secondary scaffold opening being configured to allow the first secondary beam to move therethrough during repositioning of the first mould between the open mould position and the closed mould position, the mould system further comprises a first secondary movable platform attached to the first mould and being configured to move between an extended platform position and a stored platform position, and wherein the first secondary movable platform covers the first secondary scaffold opening in the extended position and wherein the first secondary movable platform is arranged to expose the first secondary scaffold opening in the stored platform position, wherein the first scaffold comprises a first secondary gate attached to the first tertiary scaffold part, the first secondary gate comprising a first gate locking element and optionally a second gate locking element, and being configured to be positioned in an open gate position and in a closed gate position, where the first secondary gate in the open gate position extends in the longitudinal direction such that the first gate locking element engages in a locking configuration with a first secondary scaffold locking element of the first secondary scaffold part, and where the first secondary gate in a closed gate position extends in a transverse direction perpendicular to the longitudinal direction such that the first gate locking element and/or the second gate locking element engages in a locking configuration with a first tertiary scaffold locking element of the first tertiary scaffold part;

the method further comprising, after laying up composite material and before repositioning the first mould to the closed mould position:

positioning the first primary gate in the closed gate position, after positioning the first primary gate in the closed gate position, positioning the first primary movable platform in the stored platform position, after positioning the first primary movable platform in the stored platform position, securing the first primary movable platform in the stored platform position, after positioning the first primary movable platform in the stored platform position, positioning the first secondary gate in the closed gate position, after positioning the first secondary gate in the closed gate position, positioning the first secondary movable platform in the stored platform position, after positioning the first secondary movable platform in the stored platform position, securing the first secondary movable platform in the stored platform position.

* * * * *